United States Patent
Kyogoku

(10) Patent No.: US 10,139,748 B2
(45) Date of Patent: Nov. 27, 2018

(54) LASER SCANNING DEVICE FOR SCANNING LIGHT BEAM AND IMAGE FORMING APPARATUS INCLUDING THE SAME

(71) Applicant: KYOCERA Document Solutions Inc., Osaka-shi, Osaka (JP)

(72) Inventor: Masanori Kyogoku, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/926,743

(22) Filed: Mar. 20, 2018

(65) Prior Publication Data
US 2018/0284639 A1    Oct. 4, 2018

(30) Foreign Application Priority Data
Mar. 30, 2017   (JP) .................. 2017-069064

(51) Int. Cl.
*G02B 26/10* (2006.01)
*G03G 15/04* (2006.01)
*G03G 15/00* (2006.01)

(52) U.S. Cl.
CPC ....... *G03G 15/04072* (2013.01); *G02B 26/10* (2013.01); *G03G 15/0409* (2013.01); *G03G 15/5008* (2013.01); *G03G 2215/0404* (2013.01)

(58) Field of Classification Search
CPC ......... G03G 15/04072; G03G 15/0409; G03G 15/5008; G03G 2215/0404; G02B 26/10
See application file for complete search history.

(56) References Cited

FOREIGN PATENT DOCUMENTS

| JP | 07-151986 A | * | 6/1995 | ............. G02B 26/10 |
| JP | H07151986 A | | 6/1995 | |

* cited by examiner

*Primary Examiner* — Yaovi M Ameh
(74) *Attorney, Agent, or Firm* — Alleman Hall Creasman & Tuttle LLP

(57) ABSTRACT

In a laser scanning device, a first light shielding portion and a second light shielding portion respectively shield a first light shielding region and a second light shielding region from a light beam. The first light shielding region is a part of a first region which is on one side of a target intermediate region and the second light shielding region is a part of a second region which is on the other side of the target intermediate region. The target intermediate region is a belt-like intermediate region of a light receiving surface of a light sensor. Widths of the first and second light shielding regions in the main scanning direction gradually expand from first and second base end portions to first and second side edges which are opposite ends of the light receiving surface in the sub scanning direction.

12 Claims, 8 Drawing Sheets

LASER SCANNING DEVICE FOR SCANNING LIGHT BEAM AND IMAGE FORMING APPARATUS INCLUDING THE SAME

INCORPORATION BY REFERENCE

This application is based upon and claims the benefit of priority from the corresponding Japanese Patent Application No. 2017-069064 filed on Mar. 30, 2017, the entire contents of which are incorporated herein by reference.

BACKGROUND

The present disclosure relates to a laser scanning device and an image forming apparatus including the same.

In general, an image forming apparatus of an electrophotographic system includes a laser scanning device that scans a light beam on a surface of a photoconductor. As the laser scanning device scans the light beam, an electrostatic latent image is written on the surface of the photoconductor.

In the laser scanning device, a scanning mirror such as a polygon mirror reflects the light beam so as to scan the light beam in a main scanning direction. Furthermore, a light sensor disposed on a scanning route of the light beam detects reception of the light beam. In addition, a control portion controls a timing at which the light beam writes the electrostatic latent image, based on a timing at which the light sensor generates a detection signal.

In addition, there is known a configuration where a mask having step-like light shielding portion and light transmission portion is disposed on a route of the light beam moving toward a light receiving surface of a light amount sensor. In this case, by the action of the mask, the amount of light received by the light amount sensor changes in analog depending on the position of the light beam in a sub scanning direction, during a period in which the light beam passes through the light receiving surface.

In a case where the mask is used, an average value of sampling values of detection signals of the light amount sensor indicates an amount of light received by the light amount sensor during the period in which the light beam passes through the light receiving surface.

As a result, a control portion may include a piezo actuator that adjusts the orientation of the mirror that reflects the light beam so that the average value of the sampling values approaches a predetermined target value.

SUMMARY

A laser scanning device according to an aspect of the present disclosure is configured to scan a light beam on a surface of a photoconductor so as to write an electrostatic latent image on the surface. The laser scanning device includes a scanning mirror, a light sensor, a first light shielding portion, and a second light shielding portion. The scanning mirror is configured to reflect and scan the light beam in a predetermined main scanning direction. The light sensor has a light receiving surface and is configured to detect the light beam scanned by the scanning mirror when the light beam is incident on the light receiving surface. The first light shielding portion is configured to shield a first light shielding region which is a part of a first region, from the light beam, the first region being on one side of a target intermediate region in a sub scanning direction perpendicular to the main scanning direction. The target intermediate region is a belt-like intermediate region of the light receiving surface extending from an upstream end to a downstream end of the light receiving surface in the main scanning direction. The second light shielding portion is configured to shield a second light shielding region which is a part of a second region, from the light beam, the second region being on the other side of the target intermediate region in the sub scanning direction. The first light shielding region divides the first region into an upstream region and a downstream region in the main scanning direction, and the second light shielding region divides the second region into an upstream region and a downstream region in the main scanning direction. A width of the first light shielding region in the main scanning direction gradually changes from a first base end portion to a first end portion of the first light shielding region. The first base end portion is located at an intermediate position of and extends along the target intermediate region in the main scanning direction. The first end portion extends along a first side edge which is one of opposite ends of the light receiving surface in the sub scanning direction. A width of the second light shielding region in the main scanning direction gradually changes from a second base end portion to a second end portion of the second light shielding region. The second base end portion is located at an intermediate position of and extends along the target intermediate region in the main scanning direction. The second end portion extends along a second side edge which is the other of the opposite ends of the light receiving surface in the sub scanning direction.

An image forming apparatus according to another aspect of the present disclosure includes the laser scanning device, a photoconductor, a developing device, and a transfer device. The electrostatic latent image is written on the photoconductor by the light beam scanned by the laser scanning device. The developing device is configured to develop the electrostatic latent image on the photoconductor as a toner image. The transfer device is configured to transfer the toner image on the photoconductor to a sheet.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
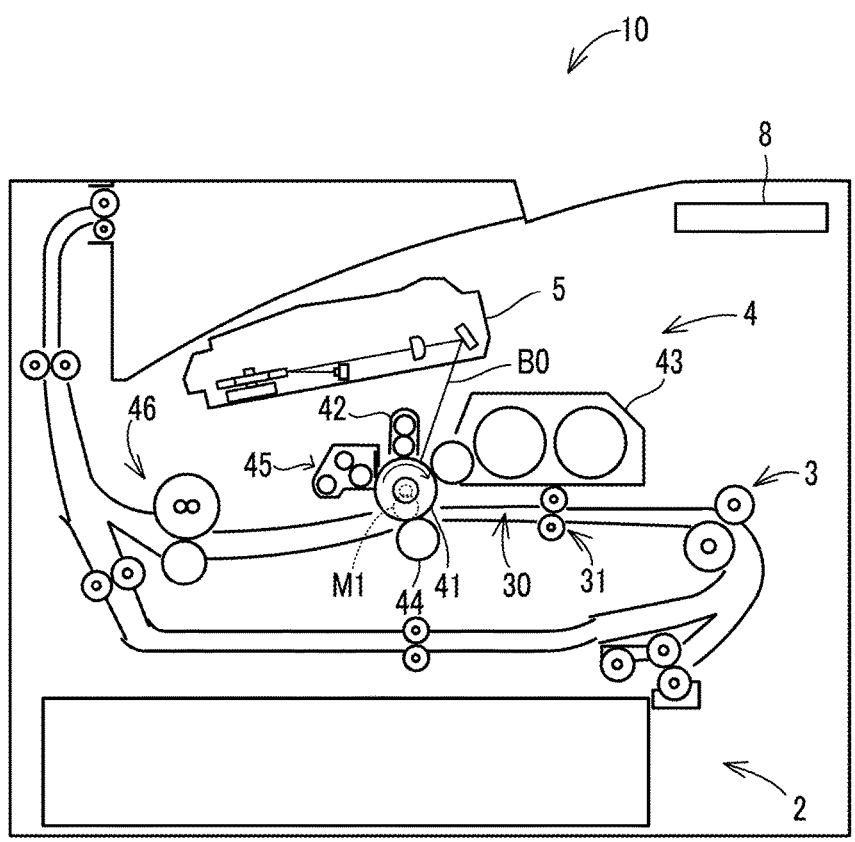
FIG. 1 is a configuration diagram of an image forming apparatus according to a first embodiment.

The following describes embodiments of the present disclosure with reference to the accompanying drawings. It should be noted that the following embodiments are an example of specific embodiments of the present disclosure and should not limit the technical scope of the present disclosure.

First Embodiment

An image forming apparatus 10 according to a first embodiment executes an image formation process by an electrophotographic system. In the image formation process, an image is formed on a sheet. The sheet is a sheet-like image formation medium such as a sheet of paper or a film.

The image forming apparatus 10 includes a sheet supply mechanism 2, a sheet conveyance mechanism 3, an image forming portion 4, and a control portion 8.

The sheet supply mechanism 2 feeds sheets one by one to a conveyance path 30 in the apparatus. The sheet conveyance mechanism 3 conveys the sheet along the conveyance path 30. The sheet conveyance mechanism 3 includes a pair of registration rollers 31. The pair of registration rollers 31 adjust the conveyance timing of the sheet by temporarily stopping the sheet before it reaches the image forming portion 4.

The image forming portion 4 executes the image formation process by the electrophotographic system. The image forming portion 4 includes a drum-like photoconductor 41, a charging device 42, a developing device 43, a transfer device 44, a cleaning device 45, a fixing device 46, and a laser scanning device 5.

The photoconductor 41 is rotationally driven by a developing motor M1, and the charging device 42 uniformly charges the surface of the photoconductor 41.

The laser scanning device 5 scans a light beam B0 on the surface of the photoconductor 41 so as to write an electrostatic latent image thereon. This allows the laser scanning device 5 to write the electrostatic latent image on the charged surface of the photoconductor 41.

The developing device 43 develops the electrostatic latent image as a toner image by supplying toner to the surface of the photoconductor 41. The transfer device 44 transfers the toner image on the photoconductor 41 to a sheet that is moving along the conveyance path 30. It is noted that the transfer device 44 may primarily transfer the toner image on the photoconductor 41 to an intermediate transfer belt (not shown), and further transfer the toner image from the intermediate transfer belt to the sheet.

The cleaning device 45 removes residual toner from the surface of the photoconductor 41. The fixing device 46 fixes the toner image transferred to the sheet, to the sheet by heating the toner image while pressing it to the sheet.

The control portion 8 receives print job data from an information terminal (not shown) or the like, and causes the image forming portion 4 to execute the image formation process based on the print job data.

Figure 2:
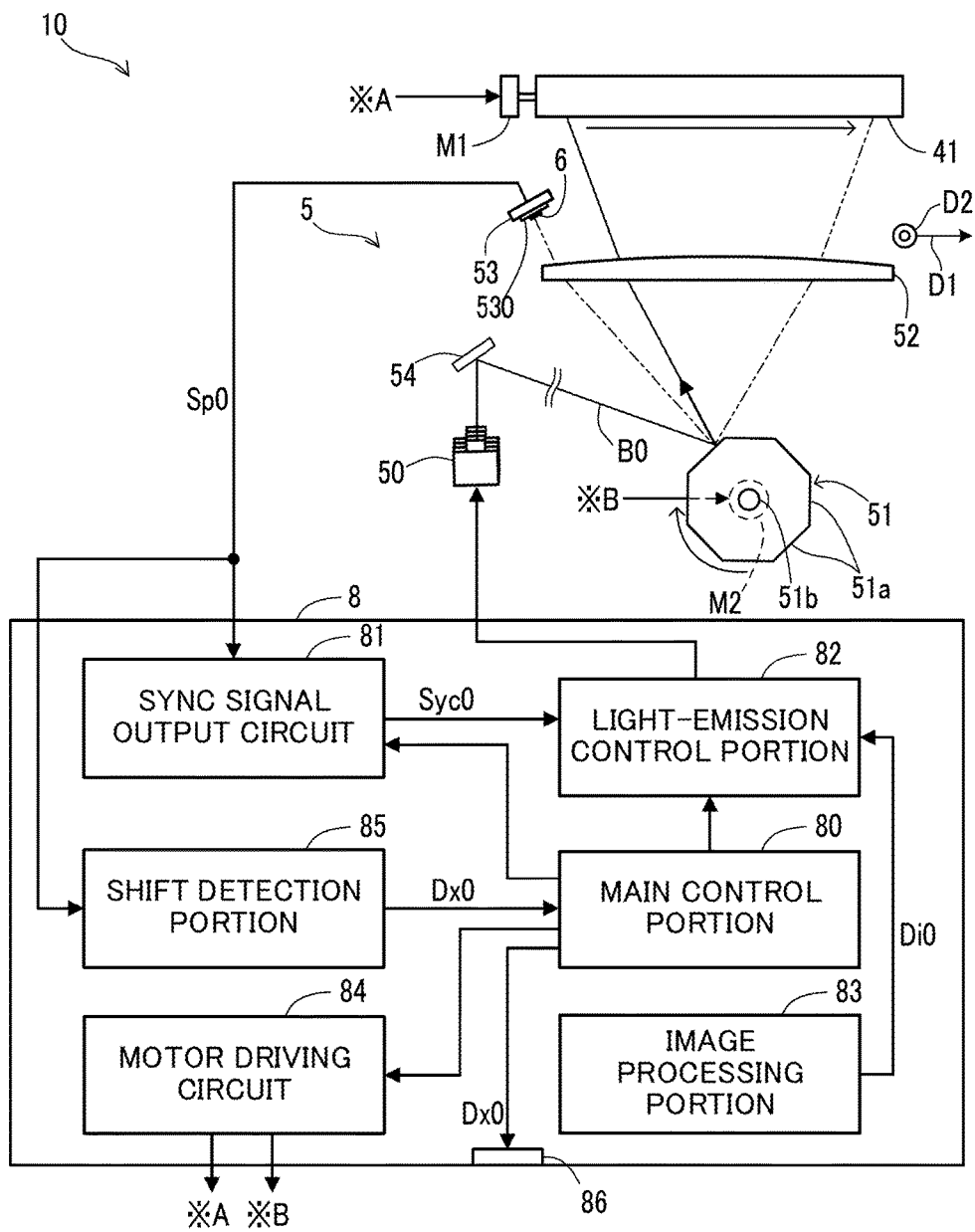
FIG. 2 is a configuration diagram of a laser scanning device and a control portion included in the image forming apparatus according to the first embodiment.

As shown in FIG. 2, the control portion 8 includes a main control portion 80, a sync signal output circuit 81, a light-emission control portion 82, an image processing portion 83, and a motor driving circuit 84.

For example, the main control portion 80, the light-emission control portion 82, and the image processing portion 83 may be realized by a processor such as an MPU (Micro Processor Unit) or a DSP (Digital Signal Processor). In addition, the sync signal output circuit 81 and the motor driving circuit 84 may include an integrated circuit such as an ASIC (Application Specific Integrated Circuit). In addition, the light-emission control portion 82 and the image processing portion 83 may be realized by a circuit that includes the processor.

The main control portion 80 executes various data processes and comprehensively controls equipment of the image forming apparatus 10 including the laser scanning device 5. For example, the main control portion 80 receives print job data from another apparatus via a communication interface device (not shown). Furthermore, the main control portion 80 causes the image forming portion 4 to execute the image formation process based on the print job data, via the image processing portion 83, the light-emission control portion 82, and the motor driving circuit 84.

The image processing portion 83 executes various image processes. For example, the image processing portion 83 converts the print job data to image data Di0 for image formation. For example, the image data Di0 is raster data.

The laser scanning device 5 includes at least one laser light source 50, a polygon mirror 51, a lens 52 such as an fθ lens, and a light sensor 53.

The laser light source 50 emits a light beam B0. The light beam B0 is guided to the polygon mirror 51 by, for example, a mirror 54 disposed at a certain position.

The polygon mirror 51 reflects and scans the light beam B0 in a predetermined main scanning direction D1. The main scanning direction D1 is the longitudinal direction of the photoconductor 41. The polygon mirror 51 includes a plurality of unit reflection surfaces 51a that are aligned in a form of a regular polygon. For example, the polygon mirror 51 includes an even number of, such as six or eight, unit reflection surfaces 51a. In the following description, a direction perpendicular to the main scanning direction D1 is referred to as a sub scanning direction D2.

The polygon mirror 51 is rotationally driven by a scanning motor M2. A rotation shaft 51b of the polygon mirror 51 is provided at the center of the regular polygon formed by the plurality of unit reflection surfaces 51a.

As the polygon mirror 51 rotates, the plurality of unit reflection surfaces 51a scan the light beam B0 in turn in the main scanning direction D1. The light beam B reflected on the polygon mirror 51 passes through the lens 52 such as the fθ lens and is irradiated on the surface of the photoconductor 41. It is noted that the polygon mirror 51 is an example of the scanning mirror of the present invention.

In the present embodiment, the laser scanning device 5 includes a plurality of laser light sources 50. The polygon mirror 51 collectively scans a plurality of light beams B0 emitted from the plurality of laser light sources 50. In this case, the laser scanning device 5 writes a plurality of lines of the electrostatic latent image onto the photoconductor 41 by the plurality of light beams B0.

The light sensor 53 has a light receiving surface 530, and detects a light beam B0 scanned by a scanning mirror when the light beam B0 is incident on the light receiving surface 530. The light sensor 53 is arranged at a position outside an effective scanning range among a total scanning range of the light beams B0 scanned by the polygon mirror 51. The effective scanning range is, among the total scanning range of the light beams B0, a maximum range in which the electrostatic latent image can be written.

The light sensor 53 outputs a pulse-shaped detection signal Sp0 when the light receiving surface 530 is receiving a light beam B0 in excess of a predetermined amount of light. That is, the light sensor 53 is a two-value output type sensor.

In the example shown in FIG. 2, the light sensor 53 is disposed on the upstream side of the photoconductor 41 in the main scanning direction D1. It is noted that the light sensor 53 may be disposed on the downstream side of the photoconductor 41 in the main scanning direction D1. In addition, two light sensors 53 may be disposed respectively on the upstream side and the downstream side of the photoconductor 41 in the main scanning direction D1.

The sync signal output circuit 81 outputs a main scanning sync signal Syc0 each time the detection signal Sp0 is generated by the light sensor 53. The main scanning sync signal Syc0 serves as a reference when starting to write the electrostatic latent image for each scanning in the main scanning direction D1.

The light-emission control portion 82 controls the timing of the light-emission control in correspondence with each scanning in the main scanning direction D1, based on a time point at which the main scanning sync signal Syc0 showed a predetermined change. The light-emission control is to control the lighting on and off of the laser light sources 50 in accordance with a plurality of pixel values of the image data Di0.

For example, each time the main scanning sync signal Syc0 shows the predetermined change, the light-emission control portion 82 starts the light-emission control in correspondence with a scanning in the main scanning direction D1 at a time point after an elapse of a predetermined time since the generation of the change.

The sync signal output circuit 81 is an example of the timing control portion that controls a writing timing of the electrostatic latent image by the light beam B0 in correspondence with the timing at which the detection signal Sp0 is generated.

The motor driving circuit 84 controls various motors such as the developing motor M1 and the scanning motor M2 in accordance with a control command from the main control portion 80. The motor driving circuit 84 is an example of the motor control portion of the present invention.

It is noted that in the control portion 8, the main control portion 80 controlling the light-emission control portion 82, the sync signal output circuit 81, the light-emission control portion 82, and the motor driving circuit 84 controlling the scanning motor M2 constitute a part of the laser scanning device 5.

Meanwhile, there is known a configuration where a mask having step-like light shielding portion and light transmission portion is disposed on a route of the of the light beam B0 moving toward a light amount sensor. In this case, by the action of the mask, the amount of light received by the light amount sensor changes in analog depending on the position of the light beam B0 in the sub scanning direction D2.

In a case where the amount of received light in the light amount sensor changes in analog depending on the position of the light beam B0 in the sub scanning direction D2, it is necessary to set a target value of the amount of received light in the light amount sensor in correspondence with the characteristics of the devices such as the laser light sources 50 and the light amount sensor. In this case, time and effort are required to set an appropriate value for the target value.

The laser scanning device 5 is configured to, without requiring time and effort for an adjustment in analog, detect whether or not the position of the light beam B0 in the sub scanning direction D2 is within a target range, and detect an amount of shift from the target range. In the following, the functions of such laser scanning device 5 are described.

Figure 3:
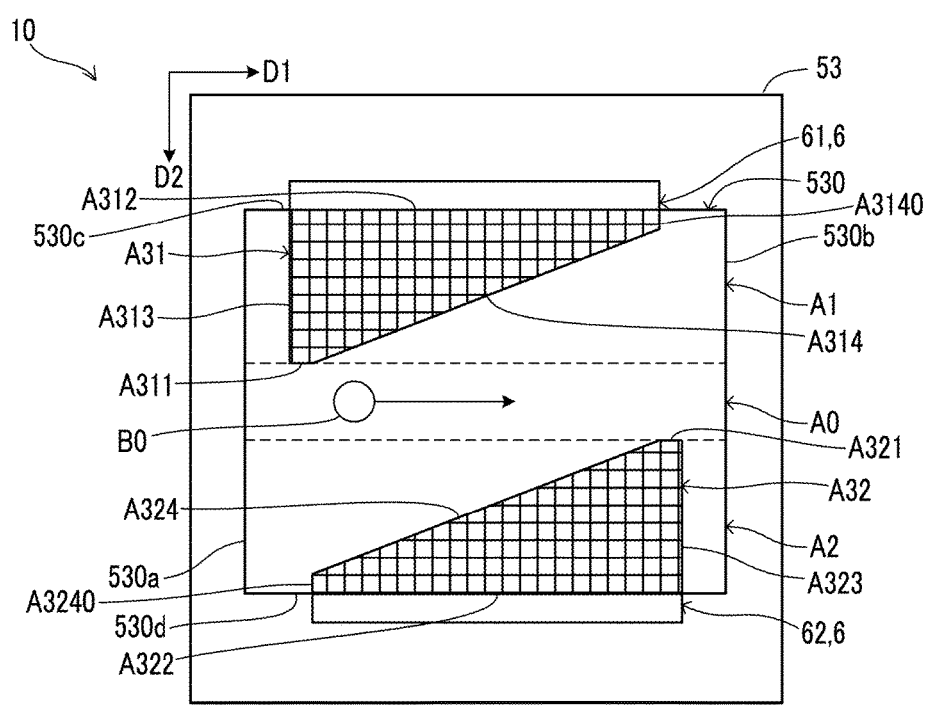
FIG. 3 is a front diagram of a light sensor and a light shielding portion included in the image forming apparatus according to the first embodiment.

As shown in FIG. 3, the laser scanning device 5 includes a mask 6 that includes a first light shielding portion 61 and a second light shielding portion 62. In the present embodiment, the first light shielding portion 61 and the second light shielding portion 62 are metal foils printed on the surface of the light sensor 53 including the light receiving surface 530. In this case, the mask 6 is printed on the surface of the light sensor 53 by a simple process that is similar to a process of printing a wiring pattern of a copper foil on a printed board.

For example, the mask 6 may be a copper foil. In addition, the mask 6 may be a film of synthetic resin.

In addition, the mask 6 may be formed integrally with the light sensor 53 such that the position of the mask 6 does not need to be adjusted with respect to the light sensor 53.

In the following description, a belt-like intermediate region of the light receiving surface 530 extending from an upstream end 530a to a downstream end 530b in the main scanning direction D1, is referred to as a target intermediate region A0. In FIG. 3, the boundaries of the target intermediate region A0 are represented by a dotted line.

In addition, in the light receiving surface 530, a region on one side of the target intermediate region A0 in the sub scanning direction D2 is referred to as a first region A1, and a region on the other side of the target intermediate region A0 is referred to as a second region A2. The target intermediate region A0, the first region A1 and the second region A2 constitute the whole region of the light receiving surface 530.

A state where at least a part of the spot of the light beam B0 passes through the target intermediate region A0 is a state where the position of the light beam B0 in the sub scanning direction D2 is within the target range. That is, the target intermediate region A0 is determined based on the target range of the light beam B0 in the sub scanning direction D2.

The first light shielding portion 61 shields a first light shielding region A31 which is a part of the first region A1, from the light beam B0. The second light shielding portion 62 shields a second light shielding region A32 which is a part of the second region A2, from the light beam B0. It is noted that in FIG. 3 to FIG. 8, hatched regions are the light shielding regions of the light receiving surface 530.

The first light shielding region A31 divides the first region A1 into an upstream region and a downstream region in the main scanning direction D1. Similarly, the second light shielding region A32 divides the second region A2 into an upstream region and a downstream region in the main scanning direction D1.

A width of the first light shielding region A31 in the main scanning direction D1 gradually increases from a first base end portion A311 to a first end portion A312, wherein the first base end portion A311 is located at an intermediate position of and extends along the target intermediate region A0 in the main scanning direction D1, and the first end portion A312 extends along a first side edge 530c which is one of opposite ends of the light receiving surface 530 in the sub scanning direction D2.

On the other hand, a width of the second light shielding region A32 in the main scanning direction D1 gradually increases from a second base end portion A321 to a second end portion A322, wherein the second base end portion A321 is located at an intermediate position of and extends along the target intermediate region A0 in the main scanning direction D1, and the second end portion A322 extends along a second side edge 530d which is the other of the opposite ends of the light receiving surface 530 in the sub scanning direction D2.

In the present embodiment, the first base end portion A311 of the first light shielding region A31 is shifted more toward the upstream in the main scanning direction D1 than the second base end portion A321 of the second light shielding region A32.

Furthermore, in the present embodiment, the first end portion A312 of the first light shielding region A31 is shifted more toward the upstream in the main scanning direction D1 than the second end portion A322 of the second light shielding region A32. The first end portion A312 extends along the first side edge 530c of the first region Al. The second end portion A322 extends along the second side edge 530d of the second region A2.

In other words, in the first light shielding region A31, the first end portion A312 is opposite to the first base end portion A311. In addition, in the second light shielding region A32, the second end portion A322 is opposite to the second side edge 530d.

Furthermore, in the present embodiment, a first upstream edge A313 which is an upstream edge of the first light shielding region A31 in the main scanning direction D1, extends along the sub scanning direction D2. Similarly, a second downstream edge A323 which is a downstream edge of the second light shielding region A32 in the main scanning direction D1, extends along the sub scanning direction D2.

On the other hand, a first downstream edge A314 which is a downstream edge of the first light shielding region A31 in the main scanning direction D1, is inclined with respect to the sub scanning direction D2. Similarly, a second upstream edge A324 which is an upstream edge of the second light shielding region A32 in the main scanning direction D1, is inclined with respect to the sub scanning direction D2.

It is noted that in the example shown in FIG. 3, the first downstream edge A314 and the second upstream edge A324 are represented by straight lines inclined with respect to the sub scanning direction D2. However, the first downstream edge A314 and the second upstream edge A324 may be formed as a staircase line or a curved line inclined with respect to the sub scanning direction D2.

In addition, as shown in FIG. 2, the control portion 8 further includes a shift detection portion 85. The shift detection portion 85 detects an amount of shift of the scanning position of the light beam B0 in the sub scanning direction D2. The amount of shift is an index value that indicates how much the light beam B0 passing through the light receiving surface 530 is shifted in the sub scanning direction D2 with respect to the target intermediate region A0.

Figure 4:
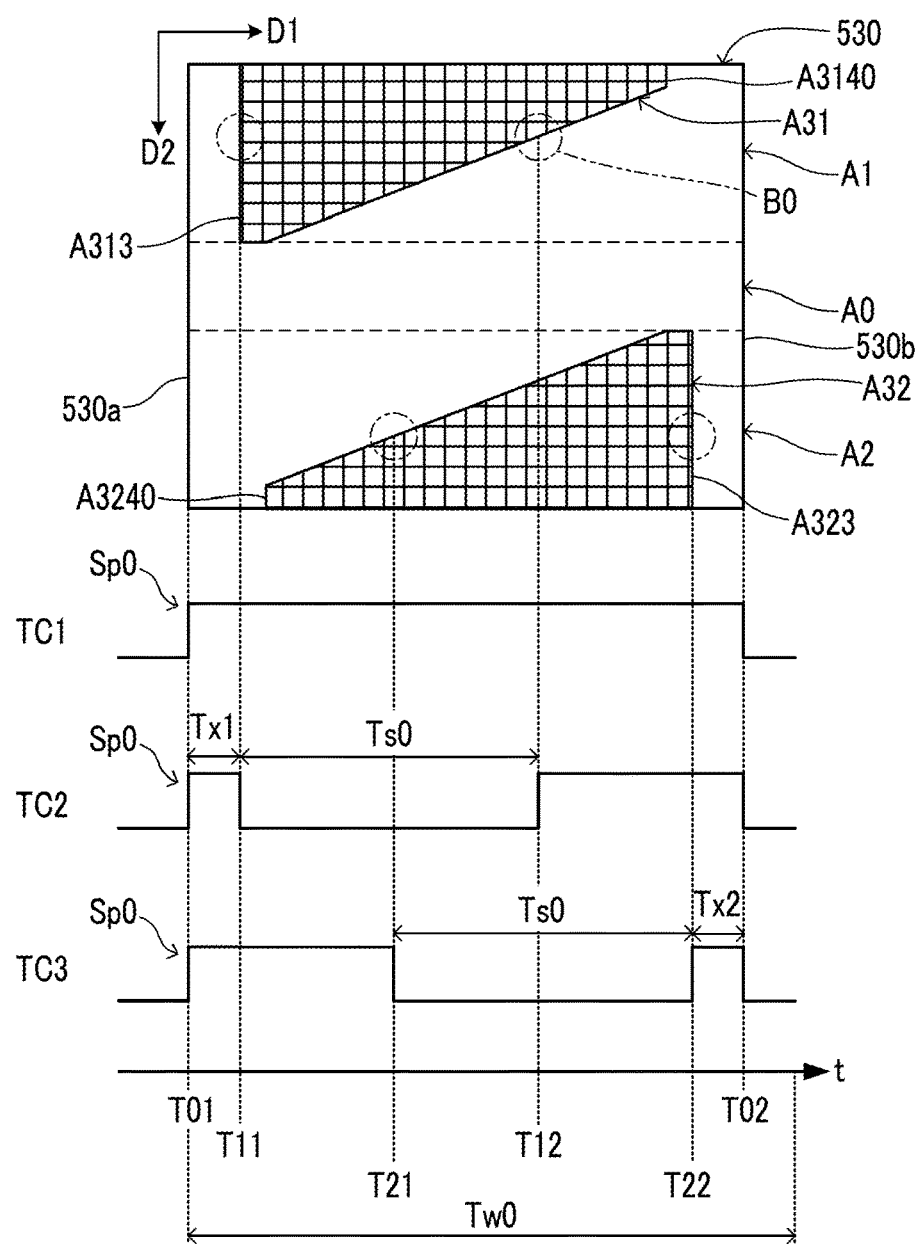
FIG. 4 is a diagram showing a light receiving surface of the light sensor and a time chart of a light detection signal in the image forming apparatus according to the first embodiment.

In FIG. 4, a first time chart TC1 shows how the detection signal Sp0 is generated when the light beam B0 passes through the target intermediate region A0. In addition, a second time chart TC2 shows how the detection signal Sp0 is generated when the light beam B0 passes through the first region Al. Furthermore, a third time chart TC3 shows how the detection signal Sp0 is generated when the light beam B0 passes through the second region A2.

As shown in the first time chart TC1, in a case where the light beam B0 passes through the target intermediate region A0, the detection signal Sp0 is generated once while the light beam B0 is scanned once in the main scanning direction D1.

On the other hand, as shown in the second time chart TC2 and the third time chart TC3, in a case where the light beam B0 passes through the first region A1 or the second region A2, the detection signal Sp0 is generated twice while the light beam B0 is scanned once in the main scanning direction D1.

In addition, the farther the position of the light beam B0 passing through the light receiving surface 530 is from the target intermediate region A0 in the sub scanning direction D2, the longer a light shielding time Ts0 between the generated two detection signals Sp0 is.

In a case where the detection signal Sp0 has been generated twice during a predetermined monitoring time Tw0, the shift detection portion 85 detects the amount of shift by measuring, in the monitoring time Tw0, the light shielding time Ts0 during which the detection signal Sp0 has not been generated.

For example, the shift detection portion 85 may be a circuit that includes a pulse detection circuit, a measuring circuit, and a comparison circuit. The pulse detection circuit detects signal-change time points at which the detection signal Sp0 rises or falls. The measuring circuit measures intervals between a plurality of signal-change time points detected by the pulse detection circuit, by, for example, counting clock signals. The comparison circuit determines the sizes of a plurality of measurement results output from the measuring circuit.

In addition, the shift detection portion 85 may be realized by a processor such as an MPU or a DSP that executes, by executing a program, a process that is equivalent to those executed by the pulse detection circuit, the measuring circuit, and the comparison circuit.

The monitoring time Tw0 is determined based on a time period that is required for scanning the light beam B0 from the upstream end 530a to the downstream end 530b of the light receiving surface 530. The monitoring time Tw0 is measured from a time point at which the detection signal Sp0 is generated.

Furthermore, the shift detection portion 85 detects the amount of shift by distinguishing between a first shift state and a second shift state, wherein in the first shift state, the light beam B0 is scanned in a state of being shifted toward the first region A1, and in the second shift state, the light beam B0 is scanned in a state of being shifted toward the second region A2.

In the following description, the $1^{st}$ detection signal Sp0 and the $2^{nd}$ detection signal Sp0 respectively mean a detection signal Sp0 initially generated and a detection signal Sp0 secondly generated during the monitoring time Tw0. It is noted that in the present embodiment, the $2^{nd}$ detection signal Sp0 is a detection signal Sp0 generated last during the monitoring time Tw0.

The shift detection portion 85 executes a state determination process for determining which of the first shift state and the second shift state the light beam B0 is in. In the state determination process, the shift detection portion 85 measures a time difference between a reference time point and a comparison time point. Furthermore, in the state determination process, the shift detection portion 85 determines which of the first shift state and the second shift state the light beam B0 is in, by determining which of the time difference and a predetermined reference value is larger than the other.

For example, the reference time point is a first detection start time point T01 at which the $1^{st}$ detection signal Sp0 rises, or a second detection end time point T02 at which the $2^{nd}$ detection signal Sp0 falls. On the other hand, the comparison time point is a first detection end time point T11, T21 at which the $1^{st}$ detection signal Sp0 falls, or a second detection start time point T12, T22 at which the $2^{nd}$ detection signal Sp0 rises.

In the present embodiment, in a case where the light beam B0 is in the first shift state, the time difference between the first detection start time point T01 and the first detection end time point T11 is always approximately equal to a first reference time Tx1. On the other hand, in a case where the light beam B0 is in the second shift state, the time difference between the first detection start time point T01 and the first detection end time point T21 is always larger than the first reference time Tx1.

Accordingly, the shift detection portion 85 can determine which of the first shift state and the second shift state the light beam B0 is in, by comparing: the time difference between the first detection start time point T01 and the first detection end time point T11, T21; with the reference value that corresponds to the first reference time Tx1. This is applicable to the time difference between the second detection end time point T02 and the first detection end time point T11, T21 by reversing the relationship between the time difference and the reference value in size. In that case, the first detection start time point T01 or the second detection end time point T02 is the reference time point, and the first detection end time point T11, T21 is the comparison time point.

Similarly, in the present embodiment, in a case where the light beam B0 is in the second shift state, the time difference between the second detection end time point T02 and the second detection start time point T22 is always approximately equal to a second reference time Tx2. On the other hand, in a case where the light beam B0 is in the first shift state, the time difference between the second detection end time point T02 and the second detection start time point T12 is always larger than the second reference time Tx2.

Accordingly, the shift detection portion 85 can determine which of the first shift state and the second shift state the light beam B0 is in, by comparing: the time difference between the second detection end time point T02 and the first detection end time point T11, T21; with the reference value that corresponds to the second reference time Tx2. This is applicable to the time difference between the first detection start time point T01 and the second detection start time point T12, T22 by reversing the relationship between the time difference and the reference value in size. In that case, the first detection start time point T01 or the second detection end time point T02 is the reference time point, and the second detection start time point T12, T22 is the comparison time point.

In addition, in the present embodiment, the first end portion A312 is more on the upstream side in the main scanning direction D1 than the second end portion A322 (see FIG. 3). As a result, the middle point between the first detection end time point T11 and the second detection start time point T12 when the light beam B0 is in the first shift state is a time point that is always closer to the first detection start time point T01 than the middle point between the first detection end time point T21 and the second detection start time point T22 when the light beam B0 is in the second shift state.

As described above, the shift detection portion 85 can determine which of the first shift state and the second shift state the light beam B0 is in, by executing the state determination process in which the middle point between the first detection end time point T11, T21 and the second detection start time point T12, T22 is set to the comparison time point, and the first detection start time point T01 or the second detection end time point T02 is set to the reference time point.

The shift detection portion 85 detects the amount of shift for each of the light beams B0 reflected by the plurality of unit reflection surfaces 51a. The polygon mirror 51 shown in FIG. 2 includes eight unit reflection surfaces 51a. In this case, the shift detection portion 85 performs eight times the detection of the amount of shift and the determination on which of the first shift state and the second shift state the light beam B0 is in, while the polygon mirror 51 scans the light beam B0 eight times.

Subsequently, the shift detection portion 85 outputs shift detection data Dx0 to the main control portion 80, wherein the shift detection data Dx0 includes the detected amounts of shift and the results of determination on which of the first shift state and the second shift state the light beam B0 is in.

The main control portion 80 causes the light-emission control portion 82 to control the writing timing of the electrostatic latent image in a case where the amount of shift is within a predetermined allowable range. For example, the allowable range may be zero or a narrow range close to zero.

In addition, the main control portion 80 outputs the shift detection data Dx0 via an output interface 86 included in the control portion 8. For example, the output interface 86 may be a display device (not shown) included in the image forming apparatus 10, or a communication device that can communicate with an information terminal for apparatus adjustment.

By referring to the shift detection data Dx0, it is possible to adjust an angle of the mirror 54 of the laser scanning device 5.

The laser scanning device 5 may include a piezo actuator (not shown) for changing an angle of the mirror 54. In that case, the control portion 8 may automatically adjust the angle of the mirror 54 so as to eliminate the amount of shift by controlling the piezo actuator based on the shift detection data Dx0.

In addition, the shift detection data Dx0 may be collected, and the collected shift detection data Dx0 may be analyzed. This contributes to a statistical analysis or invenstigation of a cause of a defect of the polygon mirror 51 or a failure to adjust an optical axis of the light beam B0.

For example, the control portion 8 may control the piezo actuator in a direction in which the maximum value of a plurality of amounts of shift that corresponds to the plurality of unit reflection surfaces 51a approaches zero.

In addition, in a case where the detection result of the shift detection portion 85 satisfies a predetermined small error condition, the control portion 8 may execute a temporary control that is described below. The small error condition is that an amount of shift exceeding the allowable range is detected from one or more unit reflection surfaces 51a among all of the unit reflection surfaces 51a, and an amount of shift exceeding the allowable range is not detected from any of a pair of adjacent unit reflection surfaces 51a among all of the unit reflection surfaces 51a.

That is, in other words, the small error condition is that an amount of shift exceeding the allowable range is detected from only odd-numbered unit reflection surfaces 51a or only even-numbered unit reflection surfaces 51a in the circumferential direction of the polygon mirror 51.

In the temporary control, the motor driving circuit 84 restricts the rotation speed of the developing motor M1 to half of a first standard speed. The first standard speed is a rotation speed of the developing motor M1 during the image formation process executed in the normal mode when an amount of shift exceeding the allowable range is not detected from any of the unit reflection surfaces 51a.

Furthermore, in the temporary control, in accordance with a command from the main control portion 80, the sync signal output circuit 81 outputs main scanning sync signals Syc0 that correspond to only detection signals Sp0 corresponding to odd-numbered unit reflection surfaces 51a, or main scanning sync signals Syc0 that correspond to only detection signals Sp0 corresponding to even-numbered unit reflection surfaces 51a.

That is, in the temporary control, the sync signal output circuit 81 and the light-emission control portion 82 control the writing timing of the electrostatic latent image with respect to only light beams B0 reflected by, among all of the unit reflection surfaces 51a, a half number of unit reflection surfaces 51a that are alternately arranged in the circumferential direction of the polygon mirror 51 and from which an amount of shift exceeding the allowable range has not been detected. In this case, the electrostatic latent image is not written by light beams B0 reflected by the remaining half number of unit reflection surfaces 51a.

In addition, the main control portion 80 outputs, on a display device (not shown), a message that the image forming apparatus 10 has transitioned to a mode for the temporary control. Furthermore, in a case where the detection result of the shift detection portion 85 satisfies the small error condition, the main control portion 80 may select, in accordance with an operation performed on an operation device such as a touch panel (not shown), either to cause the image forming portion 4 to execute the image formation process in the temporary control mode, or to cause the image forming portion 4 to execute the image formation process in the normal mode.

The laser scanning device 5 does not require a process for determining whether or not a detected value of the amount of received light of the light beam B0 that changes in analog, is close to a target value. As a result, with the adoption of the laser scanning device 5, it is possible to, without time and effort for analog adjustment, detect whether or not the position of the light beam B0 in the sub scanning direction D2 is within the target intermediate region A0, and detect the amount of shift of the position of the light beam B0 from the target intermediate region A0.

Furthermore, the first light shielding region A31 and the second light shielding region A32 are present respectively in the first region A1 and the second region A2 in a separate state. In this case, it is possible to detect the amount of shift by measuring the light shielding time Ts0 in a wide range of the light receiving surface 530 in the main scanning direction D1. As a result, the shift detection portion 85 can detect the amount of shift at high resolution.

Second Embodiment

Figure 5:
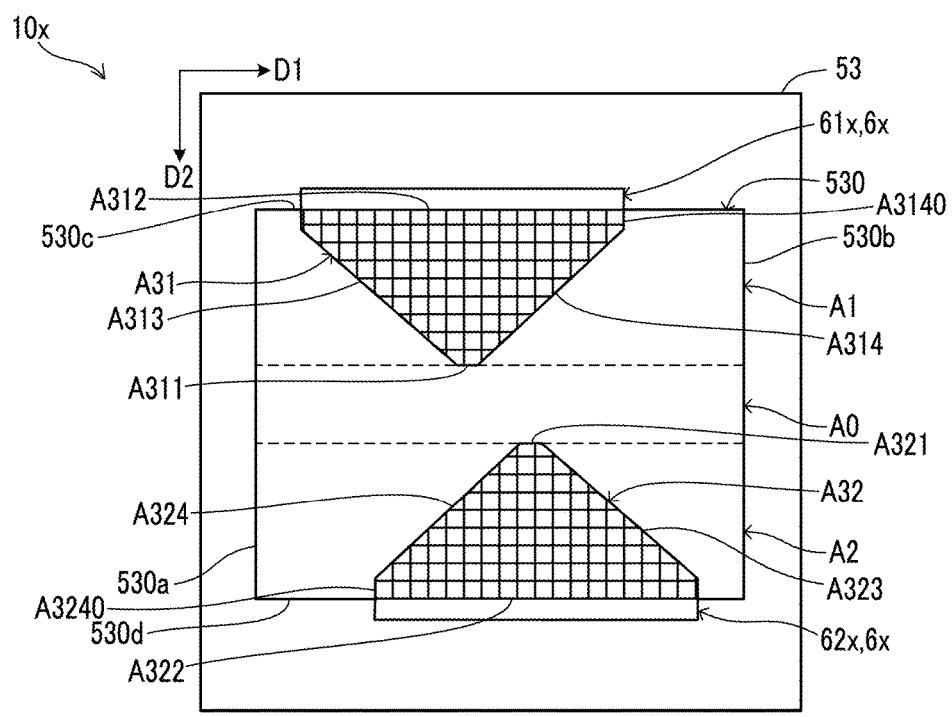
FIG. 5 is a front diagram of a light sensor and a light shielding portion included in an image forming apparatus according to a second embodiment.
Figure 6:
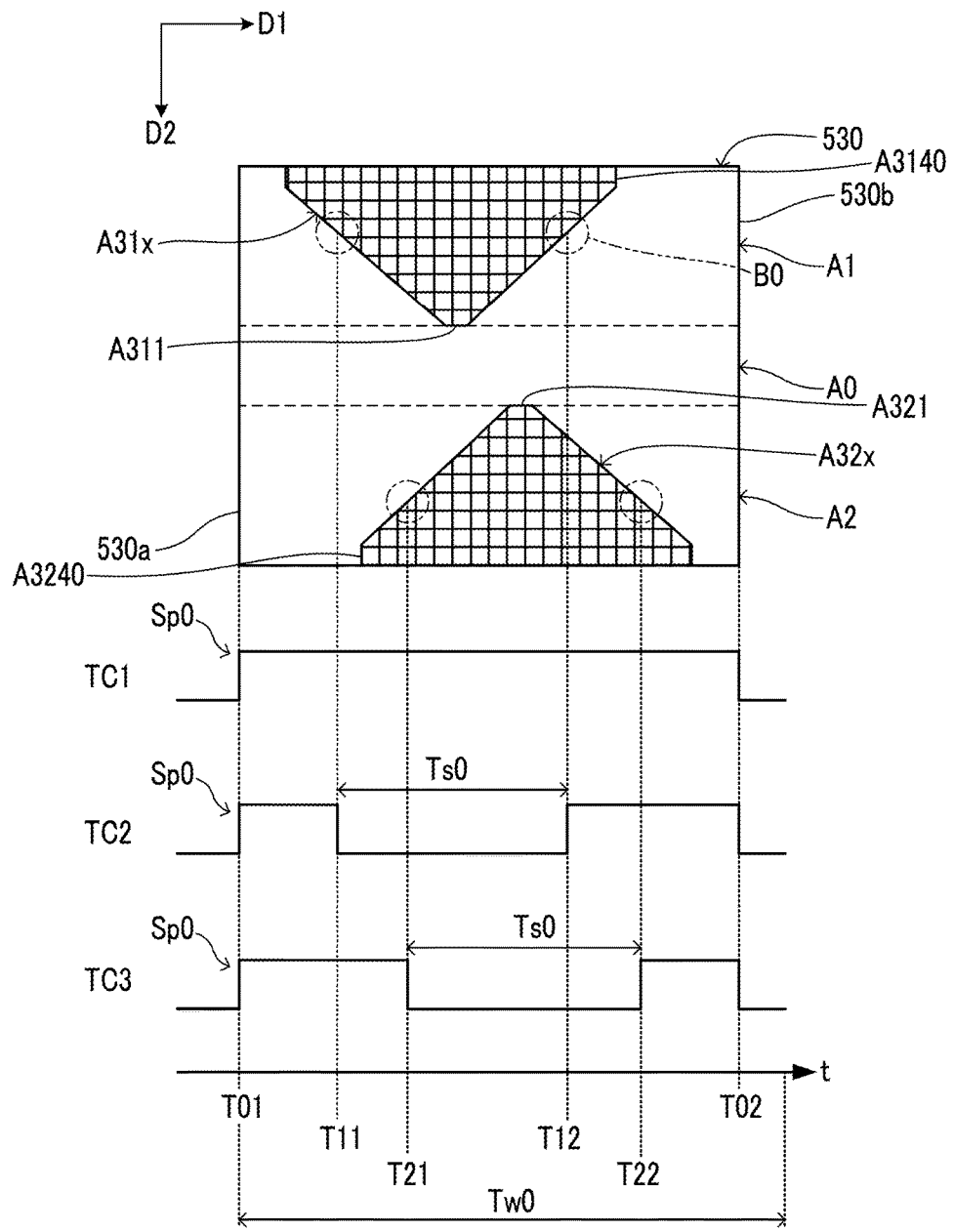
FIG. 6 is a diagram showing a light receiving surface of the light sensor and a time chart of a light detection signal in the image forming apparatus according to the second embodiment.

Next, with reference to FIG. 5 and FIG. 6, a mask 6x included in an image forming apparatus 10x according to a second embodiment, and a process executed by the shift detection portion 85 of the image forming apparatus 10x.

In FIG. 5 and FIG. 6, the same components as those shown in FIG. 1 to FIG. 4 are assigned the same reference signs. In the image forming apparatus 10x, the mask 6 of the image forming apparatus 10 has been replaced with the mask 6x shown in FIG. 5.

Similar to the mask 6 of the image forming apparatus 10, the mask 6x of the image forming apparatus 10x includes a first light shielding portion 61x and a second light shielding portion 62x. The first light shielding region A31 and the second light shielding region A32 shielded by the first light shielding portion 61x and the second light shielding portion 62x from light, respectively divide the first region A1 and the second region A2 into an upstream region and a downstream region in the main scanning direction D1.

The following describes differences between the light shielding regions of the mask 6x and the light shielding regions of the mask 6. In the light shielding regions of the mask 6x, the first upstream edge A313 of the first light shielding region A31 is inclined with respect to the sub scanning direction D2. Similarly, the second downstream edge A323 of the second light shielding region A32 is inclined with respect to the sub scanning direction D2.

The first downstream edge A314 and the first upstream edge A313 of the first light shielding region A31 are inclined to opposite sides with respect to the sub scanning direction D2. Similarly, the second upstream edge A324 and the second downstream edge A323 of the second light shielding region A32 are inclined to opposite sides with respect to the sub scanning direction D2.

Accordingly, in the first light shielding region A31 and the second light shielding region A32, the width in the main scanning direction D1 gradually increases from the first base end portion A311 and the second base end portion A321 to the first side edge 530c and the second side edge 530d, respectively.

It is noted that the positional relationship between the first base end portion A311 and the second base end portion A321 and the positional relationship between the first end portion A312 and the second end portion A322 in the first light shielding region A31 and the second light shielding region A32 of the mask 6x are the same as those in the mask 6.

In FIG. 6, the first time chart TC1 shows how the detection signal Sp0 is generated when the light beam B0 passes through the target intermediate region A0. In addition, the second time chart TC2 shows how the detection signal Sp0 is generated when the light beam B0 is in the first shift state. Furthermore, the third time chart TC3 shows how the detection signal Sp0 is generated when the light beam B0 is in the second shift state.

In the present embodiment, too, the shift detection portion 85 detects the amount of shift as in the first embodiment. That is, in a case where the detection signal Sp0 has been generated twice during the monitoring time Tw0, the shift detection portion 85 detects the amount of shift by measuring, in the monitoring time Tw0, the light shielding time Ts0 during which the detection signal Sp0 has not been generated.

In addition, in the present embodiment, the shift detection portion 85 can determine which of the first shift state and the second shift state the light beam B0 is in, by executing the state determination process in which the middle point between the first detection end time point T11, T21 and the second detection start time point T12, T22 is set to the comparison time point, and the first detection start time point T01 or the second detection end time point T02 is set to the reference time point.

When the image forming apparatus 10x is adopted, the same effect is produced as when the image forming apparatus 10 is adopted.

Third Embodiment

Figure 7:
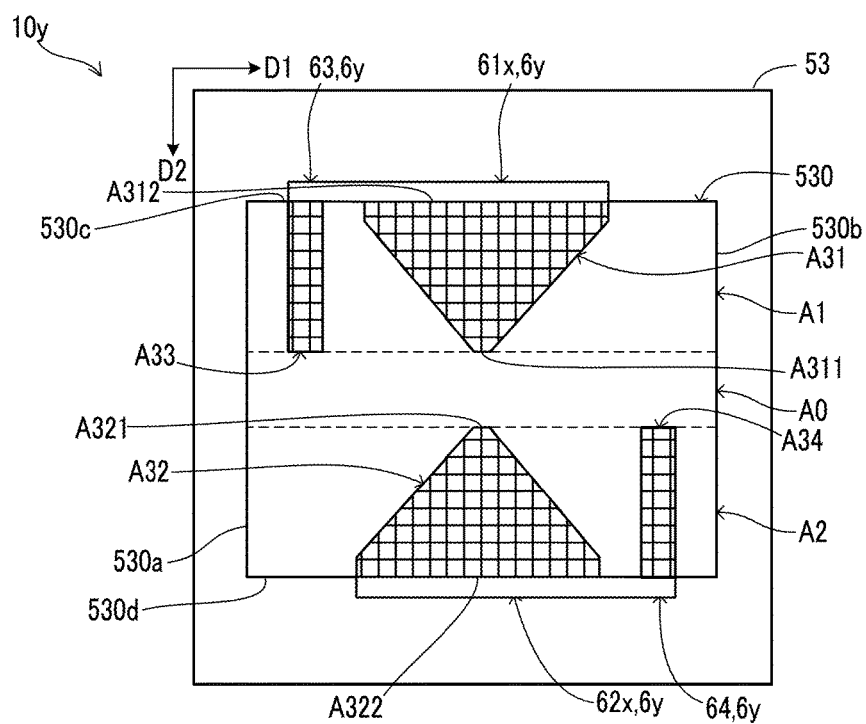
FIG. 7 is a front diagram of a light sensor and a light shielding portion included in an image forming apparatus according to a third embodiment.
Figure 8:
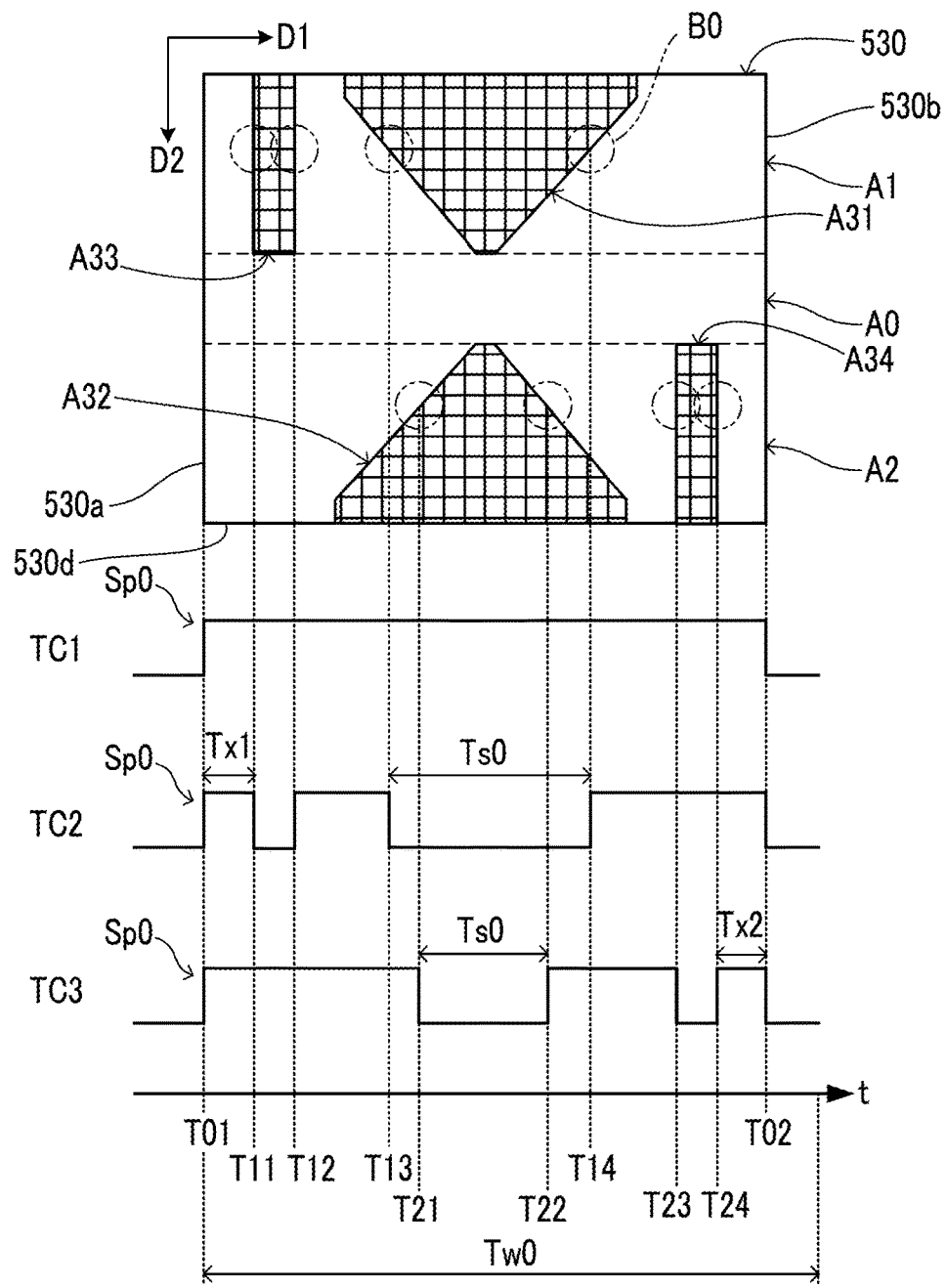
FIG. 8 is a diagram showing a light receiving surface of the light sensor and a time chart of a light detection signal in the image forming apparatus according to the third embodiment.

Next, with reference to FIG. 7 and FIG. 8, a mask 6y included in an image forming apparatus 10y according to a third embodiment, and a process executed by the shift detection portion 85 of the image forming apparatus 10y.

In FIG. 7 and FIG. 8, the same components as those shown in FIG. 1 to FIG. 6 are assigned the same reference signs. However, as described below, the reference sign "T02" shown in FIG. 8 has a slightly different meaning from that shown in FIG. 4 and FIG. 6.

In the image forming apparatus 10y, the mask 6x of the image forming apparatus 10x has been replaced with the mask 6y shown in FIG. 7.

Similar to the mask 6x of the image forming apparatus 10x, the mask 6y of the image forming apparatus 10y includes the first light shielding portion 61x and the second light shielding portion 62x. The first light shielding region A31 and the second light shielding region A32 shielded by the first light shielding portion 61x and the second light shielding portion 62x from light, respectively divide the first region A1 and the second region A2 into an upstream region and a downstream region in the main scanning direction D1.

The following describes differences between the mask 6y and the mask 6x. In the light shielding regions of the mask 6y, the first light shielding region A31 and the second light shielding region A32 are included in the same range in the main scanning direction D1.

In the example shown in FIG. 7, the first base end portion A311 and the second base end portion A321 are disposed at the same position in the main scanning direction D1. Similarly, the first end portion A312 and the second end portion A322 are disposed at the same position in the main scanning direction D1.

The mask 6y further includes a third light shielding portion 63 and a fourth light shielding portion 64, in addition to the first light shielding portion 61x and the second light shielding portion 62x.

The third light shielding portion 63 is configured to shield a third light shielding region A33 from the light beam B0, wherein the third light shielding region A33 has the shape of a belt crossing the first region A1 of the light receiving surface 530 along the sub scanning direction D2, and is disposed in the first region A1 between the upstream end 530a and the first light shielding region A31 in the main scanning direction D1. The third light shielding region A33 is on the upstream side of the second light shielding region A32 in the main scanning direction D1.

The fourth light shielding portion 64 is configured to shield a fourth light shielding region A34 from the light beam B0, wherein the fourth light shielding region A34 has the shape of a belt crossing the second region A2 of the light receiving surface 530 along the sub scanning direction D2, and is disposed in the second region A2 between the second light shielding region A32 and the downstream end 530b in the main scanning direction D1. The fourth light shielding region A34 is on the downstream side of the first light shielding region A31 in the main scanning direction D1.

In FIG. 8, the first time chart TC1 shows how the detection signal Sp0 is generated when the light beam B0 passes through the target intermediate region A0. In addition, the second time chart TC2 shows how the detection signal Sp0 is generated when the light beam B0 is in the first shift state. Furthermore, the third time chart TC3 shows how the detection signal Sp0 is generated when the light beam B0 is in the second shift state.

In the present embodiment, the shift detection portion 85 executes a state determination process and detects the amount of shift when the detection signal Sp0 is generated three times during the monitoring time Tw0, wherein the state determination process is described below. The shift detection portion 85 detects the amount of shift by measuring, during the monitoring time Tw0, the light shielding time Ts0 during which the detection signal Sp0 has not been generated.

In the following description, the $1^{st}$ detection signal SpO, the $2^{nd}$ detection signal Sp0, and the $3^{rd}$ detection signal Sp0 respectively mean a detection signal Sp0 initially generated, a detection signal Sp0 secondly generated, and a detection signal Sp0 thirdly generated during the monitoring time Tw0.

The reference sign "T02" shown in FIG. 8 represents a third detection end time point at which the $3^{rd}$ detection signal Sp0 falls It is noted that in the present embodiment, the $3^{rd}$ detection signal Sp0 is a detection signal Sp0 generated last during the monitoring time Tw0.

In the state determination process, the shift detection portion 85 measures a time difference between a reference time point and a comparison time point. Furthermore, in the state determination process, the shift detection portion 85 determines which of the first shift state and the second shift state the light beam B0 is in, by determining which of the time difference and a predetermined reference value is larger than the other.

For example, the reference time point is a first detection start time point T01 at which the $1^{st}$ detection signal Sp0 rises, or a third detection end time point T02 at which the $3^{rd}$ detection signal Sp0 falls. On the other hand, the comparison time point is a first detection end time point T11, T21 at which the $1^{st}$ detection signal Sp0 falls, a second detection start time point T12, T22 at which the $2^{nd}$ detection signal Sp0 rises, or a third detection start time point T14, T24 at which the $3^{rd}$ detection signal Sp0 rises.

In the present embodiment, in a case where the light beam B0 is in the first shift state, the time difference between the first detection start time point T01 and the first detection end time point T11 is always approximately equal to a first reference time Tx1. On the other hand, in a case where the light beam B0 is in the second shift state, the time difference between the first detection start time point T01 and the first detection end time point T21 is always larger than the first reference time Tx1.

Accordingly, the shift detection portion 85 can determine which of the first shift state and the second shift state the light beam B0 is in, by comparing: the time difference between the first detection start time point T01 and the first detection end time point T11, T21; with the reference value that corresponds to the first reference time Tx1. This is applicable to the time difference between the third detection end time point T02 and the first detection end time point T11, T21 by reversing the relationship between the time difference and the reference value in size.

Furthermore, in the present embodiment, in a case where the light beam B0 is in the second shift state, the time difference between the third detection end time point T02 and the third detection start time point T24 is always approximately equal to a second reference time Tx2. On the other hand, in a case where the light beam B0 is in the first shift state, the time difference between the third detection start time point T14 and the third detection end time point T02 is always larger than the second reference time Tx2.

Accordingly, the shift detection portion 85 can determine which of the first shift state and the second shift state the light beam B0 is in, by comparing: the time difference between the third detection end time point T02 and the third detection start time point T14, T24; with the reference value that corresponds to the second reference time Tx2. This is applicable to the time difference between the first detection start time point T01 and the third detection start time point T14, T24 by reversing the relationship between the time difference and the reference value in size.

In the present embodiment, when it is determined in the state determination process that the light beam B0 is in the first shift state, the shift detection portion 85 detects the amount of shift by measuring the light shielding time Ts0 from a second detection end time point T13 at which the $2^{nd}$ detection signal Sp0 falls, to a third detection start time point T14 at which the $3^{rd}$ detection signal Sp0 rises.

On the other hand, when it is determined in the state determination process that the light beam B0 is in the second shift state, the shift detection portion 85 detects the amount of shift by measuring the light shielding time Ts0 from a first detection end time point T21 at which the $1^{st}$ detection signal Sp0 falls, to a second detection start time point T22 at which the $2^{nd}$ detection signal Sp0 rises.

When the image forming apparatus 10y is adopted, the same effect is produced as when the image forming apparatus 10, 10x is adopted.

First Application Example

In the above-described embodiments, in a case where the detection result of the shift detection portion 85 satisfies a predetermined small error condition, the control portion 8 may execute a temporary control that is described below.

In the temporary control of the present application example, the motor driving circuit 84 controls the rotation speed of the scanning motor M2 to be twice a second standard speed. The second standard speed is a rotation speed of the scanning motor M2 during the image formation process executed in the normal mode when an amount of shift exceeding the allowable range is not detected from any of the unit reflection surfaces 51a.

Furthermore, in the temporary control of the present application example, the light-emission control portion 82 increases the light-emission power of the laser light sources 50 to be greater than that in the normal mode. In this case, the power of the light beam B0 is set such that an electrostatic latent image of the same density can be written in half time compared to the normal mode. This allows the image formation process to be executed at the same speed as in the normal mode.

Second Application Example

In the above-described embodiments, a galvano mirror or a MEMS (Micro Electro Mechanical System) mirror whose orientation changes cyclically by the Micro Electro Mechanical System, may be adopted as a scanning mirror for scanning the light beam B0.

The MEMS mirror scans the light beam B0 reciprocally by allowing a mirror that resonates with a sine wave drive signal, to reflect the light beam B0. Similarly, the galvano mirror scans the light beam B0 reciprocally.

When the MEMS mirror or the galvano mirror is adopted, the main scanning direction D1 is reversed in the forward passage and the return passage of the scanned light beam B0. As a result, the first light shielding portion 61 and the second light shielding portion 62 in the mask 6, 6x, 6y are replaced with each other in the forward passage and the return passage of the scanned light beam B0. Similarly, the third light shielding portion 63 and the fourth light shielding portion 64 in the mask 6y are replaced with each other in the forward passage and the return passage of the scanned light beam B0.

THIRD APPLICATION EXAMPLE

In the above-described embodiments, the first light shielding region A31 may be formed such that the width in the main scanning direction D1 gradually decreases from the first base end portion A311 to the first end portion A312, and the second light shielding region A32 may be formed such that the width in the main scanning direction D1 gradually decreases from the second base end portion A321 to the second end portion A322.

For example, the shape of the first light shielding region A31 and the second light shielding region A32 of the present application example is formed by rotating the shape of the first light shielding region A31 and the second light shielding region A32 in the above-described embodiments, 180 degrees around a straight line extending along the main scanning direction D1.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A laser scanning device configured to scan a light beam on a surface of a photoconductor so as to write an electrostatic latent image thereon, the laser scanning device comprising:
   a scanning mirror configured to reflect and scan the light beam in a predetermined main scanning direction;
   a light sensor having a light receiving surface and configured to detect the light beam scanned by the scanning mirror when the light beam is incident on the light receiving surface;
   a first light shielding portion configured to shield a first light shielding region which is a part of a first region, from the light beam, the first region being on one side of a target intermediate region in a sub scanning direction perpendicular to the main scanning direction, the target intermediate region being a belt-like intermediate region of the light receiving surface extending from an upstream end to a downstream end of the light receiving surface in the main scanning direction; and
   a second light shielding portion configured to shield a second light shielding region which is a part of a second region, from the light beam, the second region being on the other side of the target intermediate region in the sub scanning direction, wherein
   the first light shielding region divides the first region into an upstream region and a downstream region in the main scanning direction, and the second light shielding region divides the second region into an upstream region and a downstream region in the main scanning direction, and a width of the first light shielding region in the main scanning direction gradually changes from a first base end portion to a first end portion thereof, the first base end portion being located at an intermediate position of and extending along the target intermediate region in the main scanning direction, the first end portion extending along a first side edge which is one of opposite ends of the light receiving surface in the sub scanning direction, and a width of the second light shielding region in the main scanning direction gradually changes from a second base end portion to a second end portion thereof, the second base end portion being located at an intermediate position of and extending along the target intermediate region in the main scanning direction, the second end portion extending along a second side edge which is the other of the opposite ends of the light receiving surface in the sub scanning direction.

2. The laser scanning device according to claim 1, wherein
the first base end portion of the first light shielding region is shifted more toward an upstream in the main scanning direction than the second base end portion of the second light shielding region, and
the first end portion of the first light shielding region is shifted more toward the upstream in the main scanning direction than the second end portion of the second light shielding region.

3. The laser scanning device according to claim 2, wherein
an upstream edge of the first light shielding region in the main scanning direction and a downstream edge of the second light shielding region in the main scanning direction extend along the sub scanning direction, and
a downstream edge of the first light shielding region in the main scanning direction and an upstream edge of the second light shielding region in the main scanning direction are inclined with respect to the sub scanning direction.

4. The laser scanning device according to claim 1, further comprising:
a third light shielding portion configured to shield a third light shielding region from the light beam, the third light shielding region having a shape of a belt crossing the first region of the light receiving surface along the sub scanning direction, and being disposed in the first region between an upstream end and the first light shielding region in the main scanning direction; and
a fourth light shielding portion configured to shield a fourth light shielding region from the light beam, the fourth light shielding region having a shape of a belt crossing the second region of the light receiving surface along the sub scanning direction, and being disposed in the second region between the second light shielding region and a downstream end in the main scanning direction.

5. The laser scanning device according to claim 1, further comprising:
a shift detection portion configured to, when a detection signal has been generated a plurality of times by the light sensor during a predetermined monitoring time, detect an amount of shift of the light beam in the sub scanning direction by measuring, in the monitoring time, a light shielding time during which the detection signal has not been generated; and
a timing control portion configured to, when the amount of shift is within a predetermined allowable range, control a writing timing of the electrostatic latent image by the light beam in correspondence with a timing at which the detection signal is generated.

6. The laser scanning device according to claim 5, wherein
the first base end portion of the first light shielding region is shifted more toward an upstream in the main scanning direction than the second base end portion of the second light shielding region,
the first end portion of the first light shielding region is shifted more toward the upstream in the main scanning direction than the second end portion of the second light shielding region,
the shift detection portion executes a state determination process for determining which of a first shift state and a second shift state the light beam is in, wherein in the first shift state, the light beam is scanned in a state of being shifted toward the first region, and in the second shift state, the light beam is scanned in a state of being shifted toward the second region,
the shift detection portion, during the state determination process, determines which of the first shift state and the second shift state the light beam is in, based on a time difference between a reference time point and a comparison time point,
the reference time point is a first detection start time point at which the $1^{st}$ detection signal in the monitoring time rises, or a second detection end time point at which the $2^{nd}$ detection signal in the monitoring time falls, and
the comparison time point is a middle point between a first detection end time point at which the $1^{st}$ detection signal in the monitoring time falls, and a second detection start time point at which the $2^{nd}$ detection signal in the monitoring time rises.

7. The laser scanning device according to claim 5, wherein
the first base end portion of the first light shielding region is shifted more toward an upstream in the main scanning direction than the second base end portion of the second light shielding region,
the first end portion of the first light shielding region is shifted more toward the upstream in the main scanning direction than the second end portion of the second light shielding region,
an upstream edge of the first light shielding region in the main scanning direction and a downstream edge of the second light shielding region in the main scanning direction extend along the sub scanning direction,
a downstream edge of the first light shielding region in the main scanning direction and an upstream edge of the second light shielding region in the main scanning direction are inclined with respect to the sub scanning direction,
the shift detection portion executes a state determination process for determining which of a first shift state and a second shift state the light beam is in, wherein in the first shift state, the light beam is scanned in a state of being shifted toward the first region, and in the second shift state, the light beam is scanned in a state of being shifted toward the second region,
the shift detection portion, during the state determination process, determines which of the first shift state and the second shift state the light beam is in, based on a time difference between a reference time point and a comparison time point,
the reference time point is a first detection start time point at which the $1^{st}$ detection signal in the monitoring time rises, or a second detection end time point at which the 2$^{nd}$ detection signal in the monitoring time falls, and the comparison time point is a first detection end time point at which the 1$^{st}$ detection signal in the monitoring time falls, a second detection start time point at which the 2$^{nd}$ detection signal in the monitoring time rises, or a middle point between the first detection end time point and the second detection start time point.

8. The laser scanning device according to claim 5, further comprising:

a third light shielding portion configured to shield a third light shielding region from the light beam, the third light shielding region being on an upstream side of the second light shielding region in the main scanning direction, having a shape of a belt crossing the first region of the light receiving surface along the sub scanning direction, and being disposed in the first region between an upstream end and the first light shielding region in the main scanning direction; and a fourth light shielding portion configured to shield a fourth light shielding region from the light beam, the fourth light shielding region being on a downstream side of the first light shielding region in the main scanning direction, having a shape of a belt crossing the second region of the light receiving surface along the sub scanning direction, and being disposed in the second region between the second light shielding region and a downstream end in the main scanning direction, wherein the shift detection portion executes a state determination process for determining which of a first shift state and a second shift state the light beam is in, wherein in the first shift state, the light beam is scanned in a state of being shifted toward the first region, and in the second shift state, the light beam is scanned in a state of being shifted toward the second region, the shift detection portion, during the state determination process, determines which of the first shift state and the second shift state the light beam is in, based on a time difference between a reference time point and a comparison time point, the reference time point is a first detection start time point at which the 1$^{st}$ detection signal in the monitoring time rises, or a third detection end time point at which the 3$^{rd}$ detection signal in the monitoring time falls, and the comparison time point is a first detection end time point at which the 1$^{st}$ detection signal in the monitoring time falls, a second detection start time point at which the 2$^{nd}$ detection signal in the monitoring time rises, a second detection end time point at which the 2$^{nd}$ detection signal in the monitoring time falls, or a third detection start time point at which the 3$^{rd}$ detection signal in the monitoring time rises.

9. The laser scanning device according to claim 5, wherein the scanning mirror is a polygon mirror having a plurality of unit reflection surfaces that are aligned in a form of a regular polygon, and the shift detection portion detects the amount of shift for each of light beams reflected by the plurality of unit reflection surfaces.

10. The laser scanning device according to claim 1, wherein the light shielding portion is a metal foil printed on a surface of the light sensor including the light receiving surface.

11. An image forming apparatus comprising:

the laser scanning device according to claim 5;

a photoconductor on which the electrostatic latent image is written by the light beam scanned by the laser scanning device;

a developing device configured to develop the electrostatic latent image on the photoconductor as a toner image; and a transfer device configured to transfer the toner image on the photoconductor to a sheet.

12. The image forming apparatus according to claim 11, further comprising:

a motor control portion configured to control a motor which is configured to rotationally drive the photoconductor, wherein the scanning mirror is a polygon mirror having a plurality of unit reflection surfaces that are aligned in a form of a regular polygon, the shift detection portion detects the amount of shift for each of light beams reflected by the plurality of unit reflection surfaces, and in a case where the shift detection portion detects an amount of shift exceeding the allowable range from one or more unit reflection surfaces among all of the unit reflection surfaces and does not detect an amount of shift exceeding the allowable range from any of a pair of adjacent unit reflection surfaces among all of the unit reflection surfaces, the motor control portion restricts a rotation speed of the motor to half of a standard speed which is a rotation speed of the motor when an amount of shift exceeding the allowable range is not detected, and the timing control portion controls the writing timing of the electrostatic latent image with respect to only light beams reflected by, among all of the unit reflection surfaces, a half number of unit reflection surfaces that are alternately arranged in a circumferential direction of the polygon mirror and from which an amount of shift exceeding the allowable range has not been detected.

* * * * *